J. A. CHAMBERS.
MANUFACTURE OF GLASS.
APPLICATION FILED JAN. 26, 1916.
1,186,076.
Patented June 6, 1916.
3 SHEETS—SHEET 2.
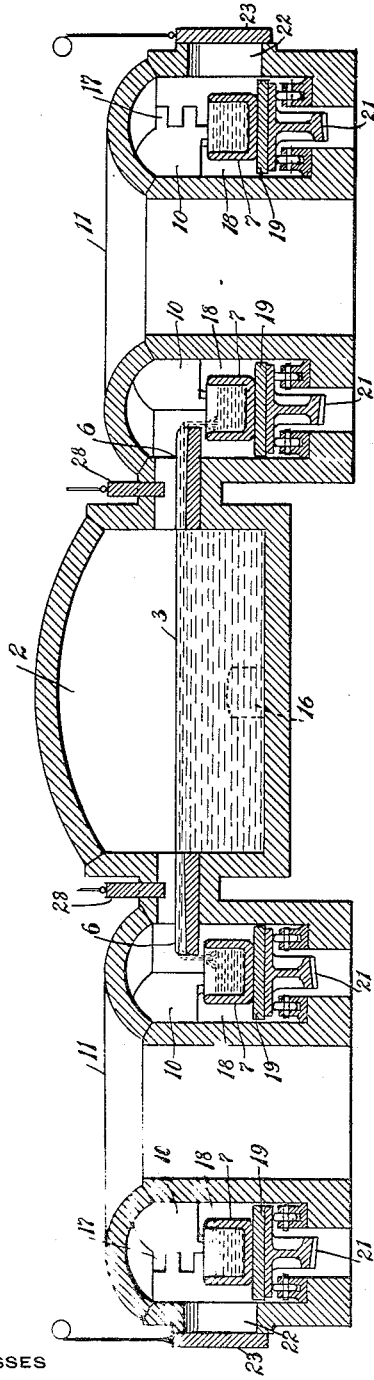
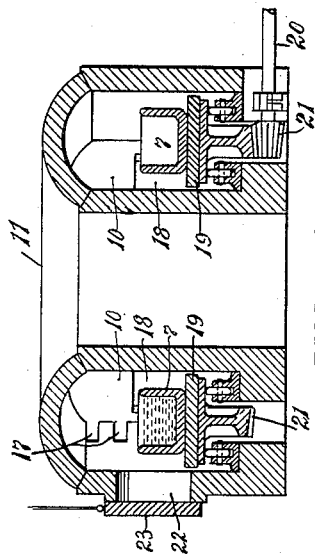
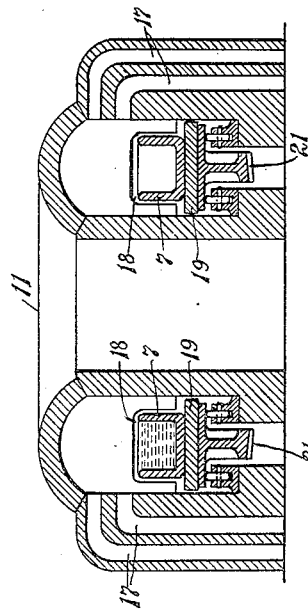
WITNESSES
A M Goodwin
INVENTOR
James A. Chambers
by James K. Bakewell
his ATTORNEYS

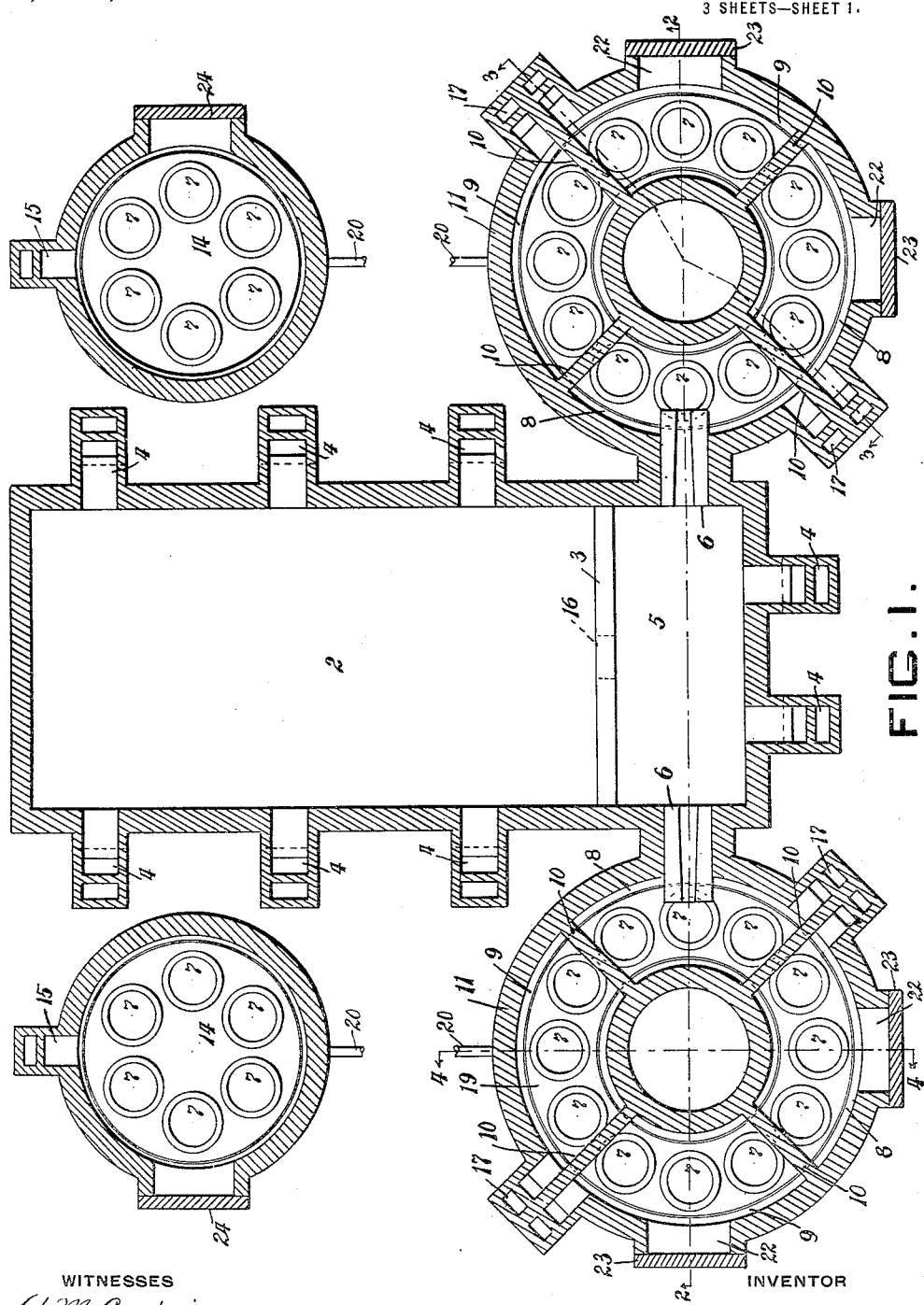

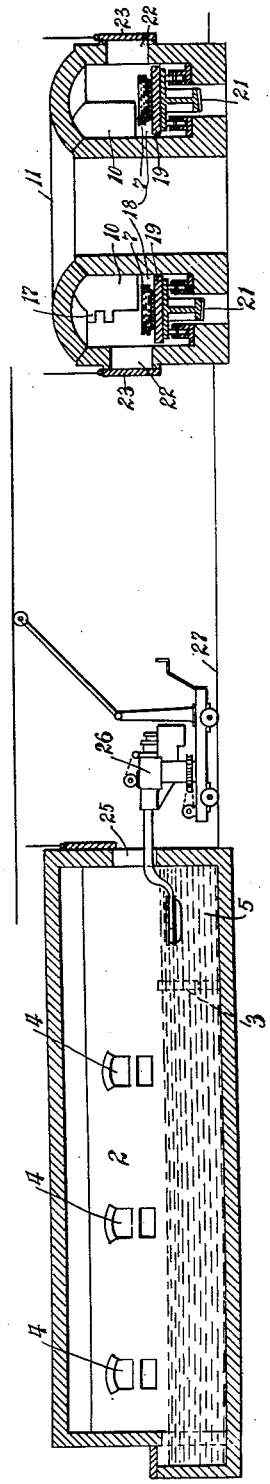

UNITED STATES PATENT OFFICE.

JAMES A. CHAMBERS, OF PITTSBURGH, PENNSYLVANIA.

MANUFACTURE OF GLASS.

1,186,076.  Specification of Letters Patent.  Patented June 6, 1916.

Application filed January 26, 1916. Serial No. 74,319.

*To all whom it may concern:*

Be it known that I, JAMES A. CHAMBERS, of the city of Pittsburgh, in the county of Allegheny and State of Pennsylvania, a citizen of the United States, have invented a certain new and useful Improvement in the Manufacture of Glass, of which the following is a full, clear, and exact description.

Heretofore in the manufacture of plate and window glass, where the molten glass has been taken from a tank furnace and drawn into cylinders in making window glass, or where it has been attempted to cast the molten glass from tank furnaces in making plate glass, the product has been defective owing to the existence of what are known as bubbles or imperfections in the glass. The purpose of my invention is to overcome this defect, and it consists in transferring the molten glass from the tank furnace to earthenware or refractory receptacles, maintaining the molten glass in the receptacle at the required heat to eliminate the bubbles or imperfections from the glass, and then drawing the cylinders from the receptacle, or casting the molten glass from the receptacle on the casting table.

I will now describe my invention so that others skilled in the art to which it appertains may employ the same; reference being had to the accompanying drawing, forming part of this specification, in which—

Figure 1 is a horizontal sectional view of a tank furnace and refining furnace which may be employed in the practice of my invention; Fig. 2 is a vertical sectional view on the line 2—2 of Fig. 1; Fig. 3 is a vertical sectional view on the line 3—3 of Fig. 1; Fig. 4 is a vertical sectional view on the line 4—4 of Fig. 1; and Fig. 5 is a vertical sectional view of a modification.

In the drawing 2 represents the melting chamber of a tank furnace which is separated from the glass chamber 5 by the partition member 3 but communicates therewith, as by the opening 16 which is located at the lower portion of the bridge wall. This furnace is provided with heating flues 4 for the purpose of melting the glass and for keeping the glass in the glass chamber at the proper temperature. At each side of the glass chamber 5 is a refining furnace 11, which as shown in the drawing is divided into four compartments 8 and 9 by partition walls 10, each of which compartments is provided with a separate heating flue 17, and the compartments communicate with each other by the openings 18. Leading from the glass chamber 5 to the compartment 8 is a spout 6. The floor of the compartments 8 and 9 is in the form of a turn-table 19, which may be operated from the shaft 20 through the gears 21, and opening into one or more of the compartments 9 are doorways 22, adapted to be closed by doors 23. Adjacent to the tank furnace are pot-heating furnaces 14 having heating flues 15 and doors 24. The purpose of these furnaces is to heat the clay pots or receptacles before they are placed in the refining furnace.

In Fig. 5 I show a modification in which the tank furnace and the refining chambers are separated, the purpose being to fill the clay pots by dipping the glass from the tank furnace and then carrying the pots to the refining furnace by means of tongs or a crane adapted to that purpose, in which case the spout 6 is dispensed with, the glass being removed through the doorway 25, opening into the glass chamber 5, by means of the dipping crane 26 which is adapted to run or travel on the track 27, which leads from the doorway 25 to one of the doorways of the refining furnace.

From a series of exhaustive experiments I have learned that by flowing the glass, or dipping the same, from the glass chamber by means of clay pots or receptacles, and then subjecting the molten glass in the pots to a temperature approximately equal to or greater than the temperature of the glass in the glass chamber, the so called bubbles or imperfections in the molten glass rise to the surface of the molten glass and disappear, after which the molten glass may be reduced in temperature to that required for drawing or casting, and the finished product will be found to be substantially free from these imperfections.

Although I do not desire to limit myself to the following practice, I have found that it under ordinary circumstances gives the best results. When the temperature of the molten glass in the glass chamber 5 is at from 2000 to 2400 degrees Fahrenheit and the temperature in the refining chamber 8 is sufficient to raise the temperature of the glass to from 2200 to 2500 degrees F., the door 28 in the spout 6 is raised to allow the molten glass to flow from the glass chamber 5 to the pot 7 in the chamber 8, the pot having been previously heated in the heating furnace 14, and brought in the chamber 8 to the temperature of that chamber. When the pot 7 is full it is moved by the turn-table 19 from beneath the spout and a second pot is substituted therefor; but the molten glass in the first pot must be allowed to remain at a temperature of from 2200 to 2500 degrees in the chamber 8, or 9, until the bubbles or imperfections cease to rise to the surface, that is from half an hour to an hour and a half, more or less according to the temperature of the glass and other conditions. When the bubbles cease to rise the pot must be brought into a lower temperature to gradually cool to the temperature required for working, which is done by carrying the pot, by means of the turn-table, into the chamber 9 having the door 23, where it may be allowed to remain until the molten glass is brought to the proper drawing or casting temperature, which is ordinarily from 1700 to 2000 degrees F. I have found that care must be taken not to allow the molten glass to remain in the high temperature of the chamber 8 after the bubbles have ceased to come to the surface, as if this be done new imperfections, of a different character from that of the bubbles, may form in the glass.

Instead of flowing the glass from the glass chamber 5 to the pot 7 in the chamber 8, the glass may be dipped from the glass chamber of the tank furnace by means of a heated pot carried by the crane 26, the pot being placed when filled in the chamber 8, the process being otherwise the same as that described.

The advantages of my invention is that it removes the greatest of the obstacles heretofore found in the manufacture of glass taken from a tank furnace.

Although I have described certain forms of apparatus, which are shown in the drawings, I do not desire to limit my invention thereto.

Having thus described my invention, what I claim and desire to secure by Letters Patent is

1. In the manufacture of glass, melting the glass in a tank furnace and bringing it therein to a flowing or dipping temperature, transferring the molten glass to a refractory receptacle, maintaining the glass at a refining temperature sufficient to eliminate the bubbles so they will not appear in the solidified glass, cooling the glass, and drawing or casting the same.

2. In the manufacture of glass, melting the glass in a tank furnace and bringing it therein to a flowing or dipping temperature, transferring the molten glass to a refractory receptacle, maintaining the glass at a temperature equal to or greater than the temperature of the molten glass in the tank furnace until the imperfections are eliminated, cooling the glass, and drawing or casting the same.

In testimony whereof I have hereunto set my hand.

JAMES A. CHAMBERS.

Witnesses:
JAMES R. BAKEWELL,
A. D. P. MILLER.